(12) United States Patent
Klein

(10) Patent No.: US 9,275,207 B2
(45) Date of Patent: Mar. 1, 2016

(54) METHOD AND NETWORK ENTITY FOR REGISTERING A USER ENTITY WITH A COMMUNICATION NETWORK VIA ANOTHER COMMUNICATION NETWORK

(75) Inventor: Andreas Klein, Bonn, DE (US)

(73) Assignee: Deutsche Telekom AG, Bonn (DE)

( * ) Notice: Subject to any disclaimer, the term of this patent is extended or adjusted under 35 U.S.C. 154(b) by 104 days.

(21) Appl. No.: 13/816,604

(22) PCT Filed: Aug. 10, 2011

(86) PCT No.: PCT/EP2011/063767
§ 371 (c)(1),
(2), (4) Date: Feb. 12, 2013

(87) PCT Pub. No.: WO2012/020051
PCT Pub. Date: Feb. 16, 2012

(65) Prior Publication Data
US 2013/0160093 A1      Jun. 20, 2013

(30) Foreign Application Priority Data

Aug. 12, 2010  (EP) .................................... 10172594

(51) Int. Cl.
| | |
|---|---|
| *G06F 15/16* | (2006.01) |
| *G06F 21/31* | (2013.01) |
| *H04L 29/06* | (2006.01) |
| *H04W 12/04* | (2009.01) |
| *H04W 12/08* | (2009.01) |
| *H04W 80/10* | (2009.01) |
| *H04W 84/12* | (2009.01) |
| *H04W 88/06* | (2009.01) |

(52) U.S. Cl.
CPC ................ *G06F 21/31* (2013.01); *H04L 63/18* (2013.01); *H04W 12/04* (2013.01); *H04W 12/08* (2013.01); *H04W 80/10* (2013.01); *H04W 84/12* (2013.01); *H04W 88/06* (2013.01)

(58) Field of Classification Search
USPC .......................................................... 726/4
See application file for complete search history.

(56) References Cited

U.S. PATENT DOCUMENTS

| | | | | |
|---|---|---|---|---|
| 5,907,544 | A * | 5/1999 | Rypinski ....................... 370/337 |
| 7,239,864 | B2 * | 7/2007 | Zhang ........................... 455/411 |

(Continued)

FOREIGN PATENT DOCUMENTS

| | | |
|---|---|---|
| CN | 101132405 | 2/2008 |
| CN | 101433036 | 5/2009 |

(Continued)

OTHER PUBLICATIONS

International Search Report for PCT/EP2011/063767, Completed by the European Patent Office on Sep. 14, 2011, 2 Pages.

(Continued)

*Primary Examiner* — Amare F Tabor
(74) *Attorney, Agent, or Firm* — Brooks Kushman P.C.

(57) ABSTRACT

A network entity for registering a user entity with a first communication network, wherein the user entity and the network entity providing access to the first communication network are registered with a second communication network. The network entity has a transceiver for transferring at least one registration message for registering said user entity with the first communication network between the user entity and the network entity over the second communication network.

13 Claims, 3 Drawing Sheets

(56) References Cited

U.S. PATENT DOCUMENTS

| | | | |
|---|---|---|---|
| 7,395,336 | B1 | 7/2008 | Santharam et al. |
| 7,640,036 | B2 * | 12/2009 | Kallio ............ 455/552.1 |
| 7,721,106 | B2 | 5/2010 | Zhang |
| 8,340,084 | B2 * | 12/2012 | Nakada et al. ............ 370/352 |
| 8,582,566 | B2 | 11/2013 | Bae et al. |
| 2004/0208144 | A1 * | 10/2004 | Vinayakray-Jani ............ 370/331 |
| 2004/0225878 | A1 * | 11/2004 | Costa-Requena et al. .... 713/150 |
| 2005/0014485 | A1 | 1/2005 | Kokkonen et al. |
| 2005/0059398 | A1 | 3/2005 | Jaupitre et al. |
| 2005/0278447 | A1 | 12/2005 | Raether et al. |
| 2006/0178131 | A1 | 8/2006 | Huotari et al. |
| 2007/0259651 | A1 | 11/2007 | Bae et al. |
| 2008/0215736 | A1 | 9/2008 | Astrom et al. |
| 2008/0267171 | A1 * | 10/2008 | Buckley et al. ............ 370/352 |
| 2009/0034736 | A1 * | 2/2009 | French ............ 380/278 |
| 2009/0193131 | A1 | 7/2009 | Shi |
| 2010/0015968 | A1 | 1/2010 | Moriwaki et al. |
| 2010/0157985 | A1 | 6/2010 | Nakada et al. |
| 2010/0177780 | A1 * | 7/2010 | Ophir et al. ............ 370/401 |
| 2010/0182998 | A1 * | 7/2010 | Nakada et al. ............ 370/352 |
| 2010/0274908 | A1 | 10/2010 | Koskelainen |
| 2011/0164613 | A1 | 7/2011 | Xie |
| 2011/0270995 | A1 | 11/2011 | Mutikainen et al. |
| 2012/0005157 | A1 | 1/2012 | Forsberg et al. |
| 2012/0026946 | A1 * | 2/2012 | Zhu et al. ............ 370/328 |

FOREIGN PATENT DOCUMENTS

| | | |
|---|---|---|
| CN | 101437093 | 5/2009 |
| EP | 1523208 | 4/2005 |
| EP | 1853037 | 11/2007 |
| EP | 2061269 | 5/2009 |
| EP | 2068529 | 6/2009 |
| JP | 2001202014 | 7/2001 |
| WO | 03092218 | 11/2003 |
| WO | 2006120289 | 11/2006 |
| WO | 2008120028 | 10/2008 |
| WO | 2008145610 | 12/2008 |
| WO | 2008152133 | 12/2008 |
| WO | 2009074846 | 6/2009 |
| WO | 2010031230 | 3/2010 |

OTHER PUBLICATIONS

Ericsson., 3GPP TSG SA WG2 Architecture—S2, No. 56, Jan. 15-19, 2007, 10 Pages, "Consideration of the relationship between Domain Selection and Personal Network Management."

Antipolis., ETSI TS 123 228 V6.8.0, 2004, 181 Pages, "Digital cellular telecommunications system (Phase 2plus); Universal Mobile Telecommunications Systems (UMTS); IP Multimedia Subsystem (IMS); Stage 2."

Rosenberg et al. Standards Track, RFC 3261, Jun. 2002, 240 Pages, "SIP Session Initiation Protocol.".

Gonzalo., John Wiley and Sons LTD, 2004, 20 Pages, "SIP Entities.".

Gonzalo Camarillo et al. John Wiley and Sons LTD, 2004, All together 423 Pages, "Chapter 5. Session Control in the IMS.".

* cited by examiner

METHOD AND NETWORK ENTITY FOR REGISTERING A USER ENTITY WITH A COMMUNICATION NETWORK VIA ANOTHER COMMUNICATION NETWORK

CROSS-REFERENCE TO RELATED APPLICATION

This application is the U.S. national phase of PCT Appln. No. PCT/EP2011/063767 filed on Aug. 10, 2011, which claims priority to European Patent Application No. 10172594.3 filed on Aug. 12, 2010, the disclosures of which are incorporated in their entirety by reference herein.

TECHNICAL FIELD

The present invention relates to registering a user entity with a communication network, in particular a mobile communication network.

BACKGROUND

For mobile data communications, layered communication networks may be deployed as e.g. described by the 3GPP specification (3rd Generation Partnership Project). The 3GPP specification comprises three distinct layers: an application layer, a network control layer and a connectivity layer. The application layer supports end-user applications and may be implemented in mobile stations or application servers in the network. The application layer interfaces with the network layer to enable designing and implementing different services and applications. The network control layer supports communicating services across e.g. different types of networks such as circuit-switched domain networks based on the GSM standard using e.g. an ISDN-related technology or packet-switched networks employing e.g. the GPRS (General Packet Radio Service) technology. The connectivity layer is a transport layer capable of transporting any type of service via e.g. voice, data and multimedia streams.

The 3GPP specification defines the Long Term Evolution (LTE) as an access network technology. The LTE comprises a MME (Mobility Management Entity) forming a control-entity suitable for signalling and selecting a serving gateway (SGW) which routes and forwards data packets carrying e.g. multimedia services. For delivering the multimedia services across the access network, the 3GPP specification defines the IP Multimedia Subsystem (IMS). The IMS comprises a service layer forming an application layer, a control and connectivity layer forming a network control layer, and an access layer forming a connectivity layer. The control and connectivity layer comprises call session control functions (CSCF) forming central entities for Session Initiation Protocol (SIP) signalling. According to the IMS, an application server is provided for hosting and executing services for user entities. An example of an application server is the Multimedia Telephony Service server (MMTel) offering multimedia communications such as voice. Another example of an application server is the Voice Call Continuity Server (VCC).

According to the IMS, the application server interfaces with the Serving CSCF (S-CSCF) using the Session Initiation Protocol (SIP). The S-CSCF transmits a SIP invite message towards the application server in order to establish a communication link towards a user entity. The SIP invite message addresses the user entity using a public identification such as Mobile Subscriber Integrated Services Digital Network Number (MSISDN). If the user entity is available, then the application server returns the SIP invite message towards the S-CSCF. The S-CSCF forwards the received SIP invite message towards the user entity.

Another access technology is Wireless Local Area Network (WLAN). When a user entity, e.g. a mobile phone or a smart phone, enters a transmission range of a WLAN Access Point (WLAN AP) of the WLAN, then the access point may check a registration of the user entity with the WLAN, such as exemplarily described in the EP 1 523 208 A1. If the user entity is registered with the WLAN, then the user entity may offload at least a part of its traffic to the WLAN to be connected to other communication networks, like the internet. Thus, the communication link between the user entity and its mobile communication network may be unloaded. However, the user entity needs to register with the WLAN prior to traffic offloading.

SUMMARY

It is the object of the present invention to provide an efficient concept for registering a user entity with a communication network.

The object is achieved by the features of the independent claims. Further embodiments may be based on the features of the dependent claims.

The invention is based on the finding that a further communication network, to which both, the user entity and the Wireless Local Area Network Access Point (WLAN AP) are registered with, may be used for identifying or introducing the user entity at the WLAN AP. An example for such a communication network may be an IP Multimedia Subsystem (IMS) which is capable of storing necessary subscriber information, like the public identifications (IDs) of the user entity and of the WLAN AP. In particular, the IMS may be used as a bridge for registering the user entity with the WLAN.

The registering process may be automatically performed when the user entity reaches the transmission range of the WLAN AP. If the user entity is registered with the WLAN AP, then the user entity may offload some or all its communications towards the WLAN. Thus, the communication link from the user entity towards the further communication network may be unloaded.

According to an aspect, the invention relates to a method for registering a user entity with a first communication network, wherein the user entity and an access entity providing access to the first communication network are registered with a second communication network. The method has transferring at least one registration message for registering said user entity with the first communication network between the user entity and the access entity over the second communication network.

The second communication network, to which both, the access entity and the network entity are registered with, may function as a bridge for registering the user entity with the first communication network. Said second communication network may store the public IDs of the user entity and of the access entity.

The registration message may comprise at least one of: a request requesting at least one key for accessing the first communication network, or a response including at least one requested key for accessing the first communication network.

According to an embodiment, the at least one registration message may be transferred by means of the SIP protocol according to the IMS.

According to an embodiment, the access entity may be a network entity being able to communicate over the first communication network and over the second communication network.

According to an embodiment, a request requesting at least one key for accessing the first communication network may be transferred from the user entity to the access entity over the second communication network. The user entity may know the public ID of the access entity.

According to an embodiment, the request may be transferred in an SIP subscribe request according to the IMS.

The SIP subscribe request may request at least one key for accessing the first communication network, e.g. a Wireless Local Area Network (WLAN). In this regard, the SIP subscribe request may include an event type like "WLAN keys". As a response to the transferred SIP subscribe request including the event type "WLAN keys", the access entity may send the requested WLAN keys to the user entity.

According to an embodiment, a response may be transferred from the access entity to the user entity over the second communication network, if the transferred request meets an adjustable authorization rule for accessing said first communication network. The response may have the at least one requested key for accessing the first communication network.

Said adjustable authorization rule may include an indication which user entities are allowed to access the first communication network. Other user entities for which such an indication is not part of the authorization rule may not receive any response to the transferred request or may receive a response without the at least one requested key for accessing the first communication network.

According to an embodiment, the response may be transferred in a SIP response, in particular in a SIP Notify message according to the IMS.

According to an embodiment, the authorization rule may be adjusted in dependence on the at least one command of a user of the access entity.

The user of the access entity may have the ability to adjust the authorization rule according to his demands. For example, the user of the access entity may allow a defined user entity or a defined group of user entities to access the first communication network.

According to an embodiment, an invitation message may be transferred from the access entity to the user entity over the second communication network. The invitation message may invite the user entity to access the first communication network. The invitation message may include a public ID of the access entity. In response to receiving the invitation message, a request may be transferred from the user entity to the access entity over the second communication network, the request using the transferred public ID of the access entity and requesting at least one key for accessing the first communication network.

According to an embodiment, an invitation message may be transferred from the access entity to the user entity over an open link of the first communication network. The invitation message may invite the user entity to access the first communication network and may have a public ID of the access entity. In response to receiving the invitation message, a request may be transferred from the user entity to the access entity over the second communication network, the request using the transferred public ID of the access entity and requesting at least one key for accessing the first communication network.

According to an embodiment, the invitation message may be broadcast in a defined transmission range by the access entity. The invitation message may particularly include the public ID of the access entity. The user entity entering the transmission range of the access entity, e.g. a WLAN AP, may send a request to the access entity. Said request may use the public ID as received by the invitation message and may include a public ID of the user entity.

In response to receiving the request from the user entity, the access entity may have the possibility to answer the received request with a response. Said response may include at least one key for accessing the first communication network. In other words, the access entity may have the possibility to send a response to the requesting user entity. The decision, if the network entity sends a response including at least one key or access keys to the user entity, may be dependent on an authorization rule. Said authorization rule may indicate if the requesting user entity is allowed to access the communication network.

According to an embodiment, the at least one key may have a certain validity, in particular a certain temporary validity and/or a certain validity on a data volume.

By way of example, the defined temporary validity of at least one key may indicate that the user entity is only allowed to access the first communication network for a defined time duration, e.g. for five hours, or on a certain date, e.g. the next Saturday.

The defined validity on data volume may exemplarily indicate that the user entity may receive a defined data volume, e.g. 10 MB, over the first communication network.

According to an embodiment, the first communication network may be a Wireless Local Area Network (WLAN).

Further examples for the first communication network may include Wireless Personal Area Networks (WPAN), Wireless Metropolitan Area Networks (WMAN) or Wireless Wide Area Networks (WWAN).

According to an embodiment, the second communication network is a mobile communication network, in particular an IP multimedia subsystem (IMS).

According to an embodiment, the second communication network may be embodied by a plurality of communication networks being capable to communicate with each other.

According to a further aspect, the invention relates to a computer program comprising a program code for executing the method for registering a user entity with a first communication network when run on at least one computer.

According to a further aspect, the invention relates to a network entity for registering a user entity with a first communication network. The user entity and the network entity providing access to the first communication network may be registered with a second communication network. The network entity may have a transceiver for transferring at least one registration message for registering said user entity with the first communication network between the user entity and the network entity over the second communication network.

The respective means, i.e. the network entity, the transceiver and the user entity, may be implemented in hardware or in software. If said means are implemented in hardware then they may be embodied as a device, e.g. as a processor or as a computer, or as part of a system. If said means are implemented in software then they may be embodied as a computer program product, as a function, as a routine, as a program code or as an executable object.

Further features of the network entity may be directly derived from the features of the method for registering a user entity with a first communication network.

According to a further aspect, the invention relates to a method for providing access of a user entity by an access point to a first communication network. The method comprises a step of transferring an access message between the user entity and the access point over a second communication network, the access message having access information for accessing to the first communication network.

According to a further aspect, the invention relates to an access point being able to communicate over a first communication network and over a second communication network. The access point has at least a receiver and a transmitter. The receiver may be configured to receive an access request message for the first communication network over the second communication network. The access request message is adapted to request a transmission of access information for accessing the first communication network. The transmitter may be configured to transmit the access information requested by the access request message.

BRIEF DESCRIPTION OF THE DRAWINGS

Further embodiments will be described with reference to the following figures, in which.

DETAILED DESCRIPTION

Figure 1:
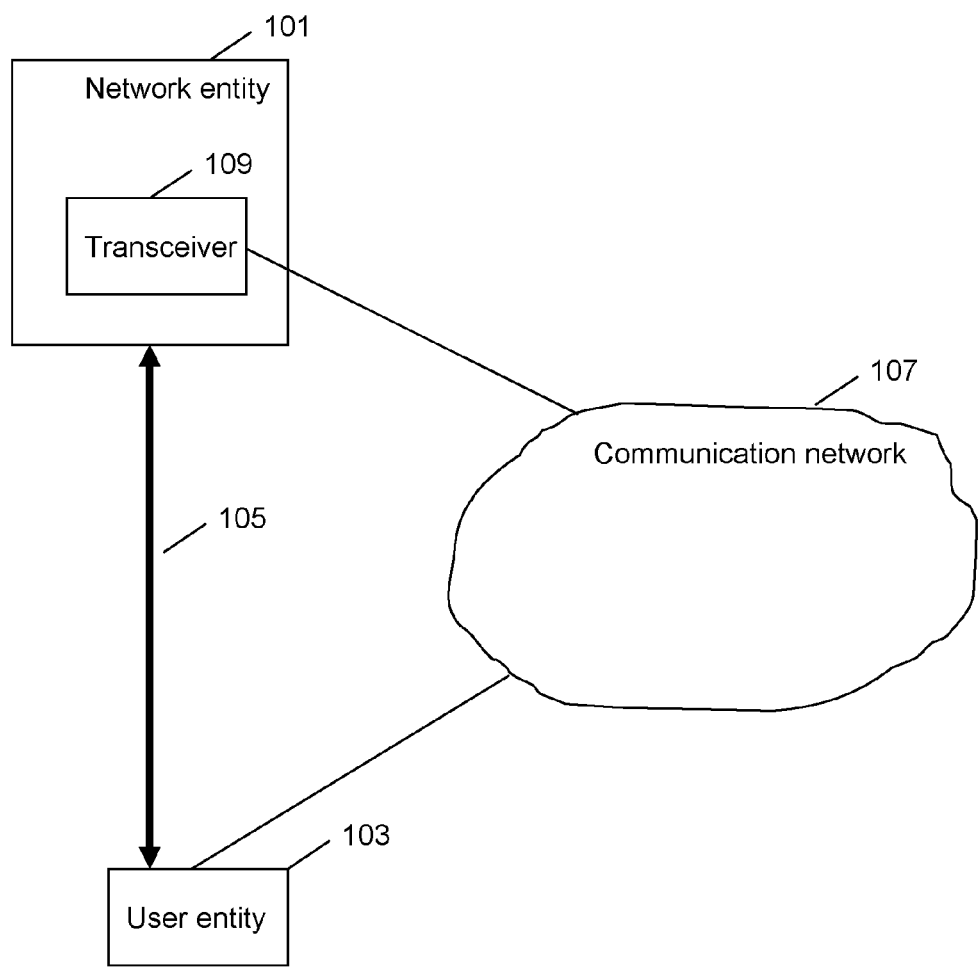
FIG. 1 shows an embodiment of a network entity for registering a user entity with a first communication network.

In FIG. 1, an embodiment of a network entity 101 for registering a user entity 103 with a first communication network 105 is illustrated. According to an embodiment, the network entity 101 and the user entity 103 are coupled by a second communication network 107. The network entity 101 has a transceiver 109 for communicating at least towards the second communication network 107.

For example, the first communication network 105 may be a WLAN with which the user entity 103 attempts to be registered.

Further, the network entity 101 and the user entity 103 are both registered with the second communication network 107. The second communication network 107 may be a mobile communication network, in particular an IP multimedia subsystem (IMS) communication network.

For registering the user entity 103 with the first communication network 105, the transceiver 109 of the network entity 101 may be used. The transceiver 109 may be configured to transmit at least one registration message for registering said user entity 103 with the first communication network 105 between the network entity 101 and the user entity 103 over the second communication network 107.

The registration message may be a request requesting at least one key for accessing the first communication network 105 or a response including at least one requested key for accessing the first communication network 105.

For example, the user entity 103 may send a request requesting at least one key for accessing the first communication network 105 over the second communication network 107 to the network entity 101. In this regard, the user entity 103 may know the public ID of the network entity 101. In particular, the public IDs of both, the user entity 103 and the network entity 101, may be known to the second communication network 107. For the case, that the second communication network 107 is an IMS network, the two public IDs may be stored in a Home Subscriber Server (HSS).

In response to receiving said request, the network entity 101 may transfer a response to the user entity 103 over the second communication network 107, if the transferred request meets an adjustable authorization rule for accessing said first communication network 105. The authorization rule may be adjusted in dependence on a command of a user of the network entity 101. Said response may include at least one requested key for accessing the first communication network 105. By way of example, the request may be transferred in an SIP subscribe request. Further, the response may be transferred in an SIP response, in particular in a SIP Notify message.

Figure 2:
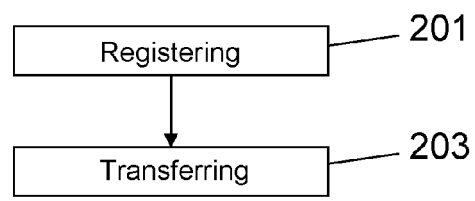
FIG. 2 shows an embodiment of a method for registering a user entity with a first communication network.

FIG. 2 shows an embodiment of a method for registering a user entity with a first communication network.

In a step 201, the user entity and an access entity providing access to the first communication network are registered with a second communication network. Exemplarily, the first communication network may be WLAN and the second communication network may be an IMS.

In a step 203, at least one registration message for registering said user entity with the first communication network may be transferred between the user entity and the access entity over the second communication network.

According to an implementation, the at least one registration message is transferred by means of the SIP protocol. Further, according to an implementation, the registration message may be a subscription message or an authentication message.

According to an implementation, an invitation message may be transferred from the access entity to the user entity over the second communication network or over an open link of the first communication network. The invitation message may be configured to invite the user entity to access the first communication network. The invitation message may include a public ID of the access entity. In response to receiving the invitation message, the request may be transferred from the user entity to the access entity over the second communication network. The request may use the transferred public ID of the access entity and may request at least one key for accessing the first communication network. For the example, that the first communication network is a WLAN and the invitation message is transferred over an open link of the WLAN, the invitation message may be broadcasted in a defined transmission range by the access entity, i.e. the WLAN AP.

Figure 3:
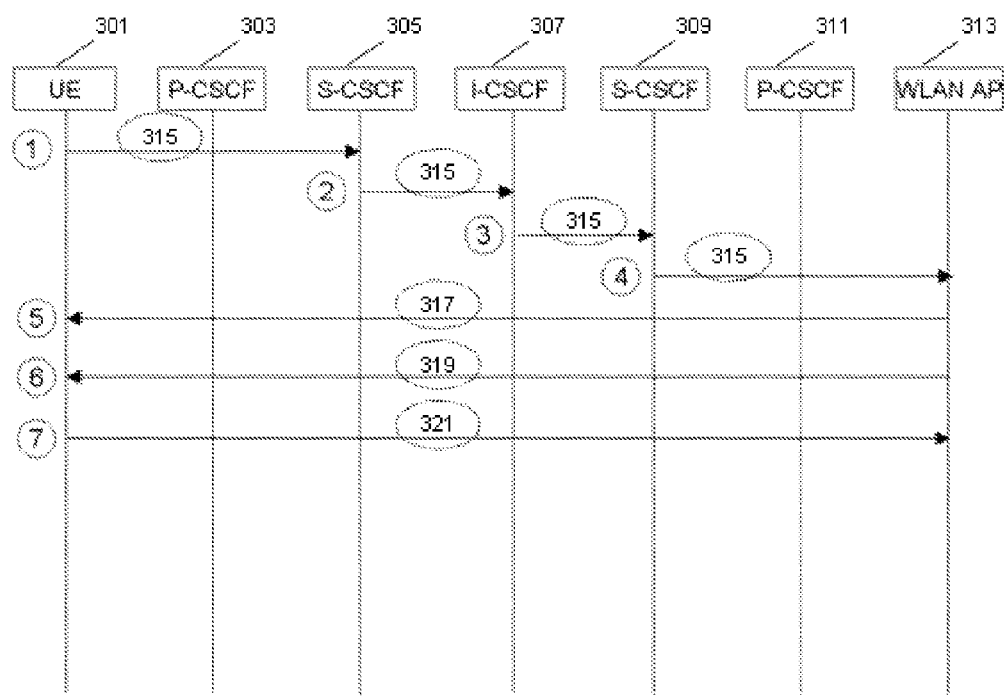
FIG. 3 shows messages for subscribing WLAN keys exchanged in a communication system according to an embodiment.

FIG. 3 shows messages for subscribing wireless local area network keys which may be exchanged in a communication system implementing the IMS architecture as defined by the 3GPP specification TS 23.228 according to an embodiment are illustrated. The communication system of FIG. 3 may include a user entity (UE) 301, a Proxy-CSCF (P-CSCF) 303 associated to the UE 301, an Serving Call Session Control Function 305 (S-CSCF) associated to the UE 301, an Interrogating-CSCF (I-CSCF) 307, an S-CSCF 309 associated to a Wireless Local Area Network Access Point (WLANAP) 313, a P-CSCF 311 associated to the WLANAP 313 and the WLAN AP 313.

The P-CSCF 303, the S-CSCF 305, the I-CSCF 307, the S-CSCF 309 and the P-CSCF 311 respectively form implementations of network control entities communicating with each other. The S-CSCFs 305, 309 and the I-SCSF 307 further communicate with a Home Subscriber Server (HSS) (not shown). The P-CSCF 303 communicates with the UE 301. The P-CSCF 311 communicates with the WLAN AP 311.

The P-CSCF 303, the S-CSCF 305, the I-CSCF 307, the S-CSCF 309 and the P-CSCF 311 are particularly used to process Session Initiation Protocol (SIP) signaling packets in the IMS communication system. According to an implementation, the S-CSCF 305 is a central node of the signaling layer and is arranged to handle SIP registrations of the UE 301 for IMS communications. In particular, the S-CSCF 305 has knowledge of a user identification such as IMS Private User-ID uniquely identifying the UE 301. The I-CSCF 307 is arranged to query the HSS to obtain an address of the S-CSCF 309. The I-CSCF 307 also forwards session initiation requests such as SIP invites to the responsible 5-CSCF.

Referring to the message flow of FIG. 3, in step 1, the UE 301 sends a SIP subscribe request 315 with an event type "WLAN keys" to the P-CSCF 303. The P-CSCF 303 forwards the SIP subscribe request 315 to the S-CSCF 305.

In step 2, the S-CSCF 305 routes the SIP subscribe request 315 to the I-CSCF 307 in the home network of the WLAN AP 313.

In step 3, the I-CSCF 307 retrieves the responsible S-CSCF 309 address from the HSS and forwards the SIP subscribe request 315 to the S-CSCF 309.

In step 4, the SIP subscribe request 315 is forwarded by the S-CSCF 309 to the WLAN AP 313 over the P-CSCF 311.

In step 5, the WLAN AP 313 checks an authorization list, if the UE 301 is allowed to query WLAN keys of the WLAN AP 313. If this is the case, the WLAN AP 313 sends back a 200 ok response 317.

In step 6, the WLAN AP 313 creates an SIP notify message containing temporarily WLAN credentials or keys and sends this SIP notify message 319 to the UE 301.

In step 7, the UE 301 acknowledges the received SIP notify message 319 with a 200 ok message 321.

Figure 4:
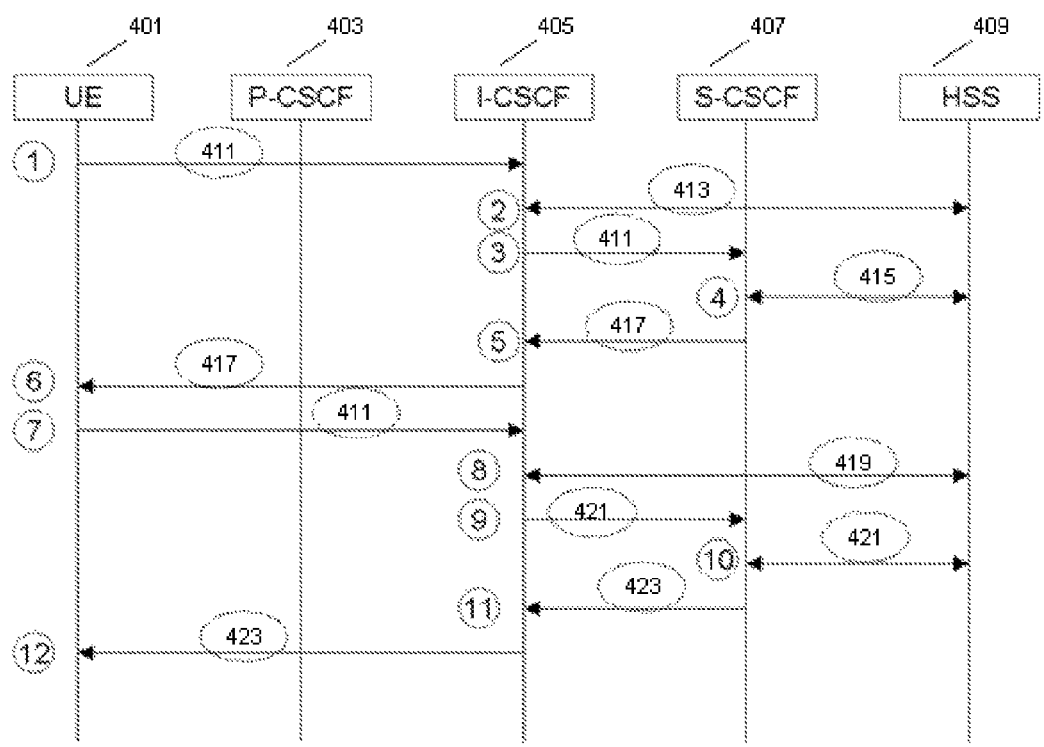
FIG. 4 further shows messages for initial IMS registration exchanged in an IMS communication system according to an embodiment.

FIG. 4 shows messages for an initial IMS registration exchanged in an IP IMS communication system according to an implementation.

The IP IMS communication system has an UE 401, a P-CSCF 403 associated to the UE 401, an I-CSCF 405, an S-CSCF 407 associated to a HSS 409 and the HSS 409.

In step 1, the UE 401 sends an SIP register request 411 to the P-CSCF 403. The P-CSCF 403 forwards the SIP register request 411 to the I-CSCF 405.

In step 2, the I-CSCF 405 queries the HSS 409 by a query 413 to receive the responsible S-CSCF 407 for the public user ID of the UE 401.

In step 3, the I-CSCF 405 forwards the SIP register request 411 to the S-CSCF 407.

In step 4, the S-CSCF 407 queries the HSS 409 by a query 415 to receive subscriber authentication data.

In step 5, the S-CSCF 407 creates a 401 unauthorized message 417 to challenge the UE 401. The S-CSCF 407 forwards the 401 unauthorized message 417 to the I-CSCF 405.

In step 6, the 401 unauthorized message 417 is forwarded to the UE 401 via the P-CSCF 403.

In step 7, the UE 401 calculates a response and adds it to the SIP register request 411 and sends the SIP register request 411 to the P-CSCF 403 which forwards it to the I-CSCF 405.

In step 8, the I-CSCF 405 queries the HSS 409 by a query 419 to receive the responsible S-CSCF for the public user ID.

In step 9, the SIP register request 411 is forwarded to the S-CSCF 407.

In step 10, the S-CSCF 407 validates the credentials and authentication is successful. The S-CSCF 407 retrieves a subscriber profile 421 from the HSS 409 for the registered public user ID.

In step 11, the S-CSCF 407 sends a 200 ok message 423 to the I-CSCF 405.

In step 12, the I-CSCF 405 transfers the 200 ok message 423 to the UE 401 via the P-CSCF 403.

According to some implementations, a user entity such as a mobile terminal may efficiently register with a WLAN AP using e.g. an IMS communication network for traffic offloading.

The above-mentioned embodiments and implementations of the methods of the present invention may be embodied by respective means to form a respective embodiment of a device.

Features of any embodiment or implementation presented herein may be combined with other features and other embodiments or implementations presented herein wherever it seems technologically desirable.

The previous description of the disclosed embodiments is provided to enable any person skilled in the art to make or use the present invention. Various modifications to these embodiments will be readily apparent to those skilled in the art, and the generic principles defined herein may be applied to other embodiments, arrangements or systems without departing from the spirit or scope of the invention. Thus, the present invention is not intended to be limited to the embodiments shown herein but is to be accorded the widest scope consistent with the principles disclosed herein.

The invention claimed is:

1. A method for registering a user entity with a first communication network, wherein the user entity and an access entity providing access to the first communication network are registered with a second communication network, the method comprising:
    transferring at least one registration message for registering said user entity with the first communication network between the user entity and the access entity over the second communication network;
    transferring an invitation message from the access entity to the user entity over the second communication network or over an open link of the first communication network, said invitation message inviting the user entity to access the first communication network and including a public identification of the access entity; and
    in response to receiving the invitation message, transferring a request from the user entity to the access entity over the second communication network, the request using the transferred public identification of the access entity and requesting at least one key for accessing the first communication network.

2. The method of claim 1, wherein the at least one registration message is transferred by way of Session Initiation Protocol.

3. The method of claim 1, wherein a request requesting at least one key for accessing the first communication network is transferred from the user entity to the access entity over the second communication network.

4. The method of claim 3, wherein the request is transferred in a Session Initiation Protocol subscribe request.

5. The method of claim 3, wherein a response is transferred from the access entity to the user entity over the second communication network, if the transferred request meets an adjustable authorization rule for accessing said first communication network, said response including the at least one requested key for accessing the first communication network.

6. The method of claim 5, wherein the response is transferred in a Session Initiation Protocol response, in particular in a Session Initiation Protocol Notify message.

7. The method of claim 5, wherein the authorization rule is adjusted in dependence on a command of a user of the access entity.

8. The method of claim 1, wherein the invitation message is broadcast by the access entity.

9. The method of claim 1, wherein the at least one key has a certain validity, in particular a certain temporary validity or a certain validity on data volume.

10. The method of claim 1, wherein the first communication network is a Wireless Local Area Network.

11. The method of claim 1, wherein the second communication network is a mobile communication network, in particular an IP multimedia subsystem.

12. A non-transitory computer-readable medium comprising program code that, when executed by a processor of a device, is configured to cause the device to:
- register a user entity with a first communication network, wherein the user entity and an access entity providing access to the first communication network are registered with a second communication network;
- transfer at least one registration message for registering said user entity with the first communication network between the user entity and the access entity over the second communication network;
- transfer an invitation message from the access entity to the user entity over the second communication network or over an open link of the first communication network, said invitation message inviting the user entity to access the first communication network and including a public identification of the access entity; and
- in response to receiving the invitation message, transfer a request from the user entity to the access entity over the second communication network, the request using the transferred public identification of the access entity and requesting at least one key for accessing the first communication network.

13. A network entity for registering a user entity with a first communication network, wherein the user entity and the network entity providing access to the first communication network are registered with a second communication network, the network entity comprising:
- a transceiver for transferring at least one registration message for registering said user entity with the first communication network between the user entity and the network entity over the second communication network;
- transferring an invitation message to the user entity over the second communication network or over an open link of the first communication network, said invitation message inviting the user entity to access the first communication network and including a public identification of the network entity; and
- receiving a request from the user entity over the second communication network, the request using the transferred public identification of the network entity and requesting at least one key for accessing the first communication network.

* * * * *